United States Patent
Greveson et al.

(10) Patent No.: US 10,311,297 B2
(45) Date of Patent: Jun. 4, 2019

(54) DETERMINATION OF POSITION FROM IMAGES AND ASSOCIATED CAMERA POSITIONS

(71) Applicant: 2D3 LIMITED, Oxford, Oxfordshire (GB)

(72) Inventors: Eric Greveson, Edinburgh (GB); James Srinivasan, Oxford (GB); Julian Morris, Oxford (GB)

(73) Assignee: The Boeing Company, Chicago, IL (US)

( * ) Notice: Subject to any disclaimer, the term of this patent is extended or adjusted under 35 U.S.C. 154(b) by 27 days.

(21) Appl. No.: 15/434,740

(22) Filed: Feb. 16, 2017

(65) Prior Publication Data

US 2017/0178358 A1   Jun. 22, 2017

Related U.S. Application Data

(63) Continuation of application No. 14/431,908, filed as application No. PCT/GB2013/052530 on Sep. 27, 2013, now Pat. No. 9,607,219.

(51) Int. Cl.
*G06K 9/00* (2006.01)
*G06K 9/46* (2006.01)
*G06K 9/52* (2006.01)
*G06K 9/62* (2006.01)
(Continued)

(52) U.S. Cl.
CPC .......... *G06K 9/00476* (2013.01); *G06K 9/46* (2013.01); *G06K 9/4671* (2013.01); *G06K 9/52* (2013.01); *G06K 9/6215* (2013.01); *G06T 7/73* (2017.01); *H04N 7/18* (2013.01); *H04N 7/183* (2013.01); *G06K 2009/4666* (2013.01);
(Continued)

(58) Field of Classification Search
CPC combination set(s) only.
See application file for complete search history.

(56) References Cited

U.S. PATENT DOCUMENTS

| 6,005,987 A | 12/1999 | Nakamura et al. |
| 2005/0190972 A1* | 9/2005 | Thomas ................. G06K 9/209 382/218 |

(Continued)

FOREIGN PATENT DOCUMENTS

JP   2007278844 A   10/2007

OTHER PUBLICATIONS

Examination Report for EP Application No. 13773830.8 (Ref. NAM/P141202EP00) from the European Patent Office dated Aug. 22, 2016, 8 pgs.

(Continued)

*Primary Examiner* — Alex Kok S Liew
(74) *Attorney, Agent, or Firm* — Toler Law Group, PC

(57) ABSTRACT

An apparatus includes an interface configured to receive image data and position data. The image data is associated with a plurality of images of a scene including an object. The position data is associated with positions of a camera that captured the plurality of images. The apparatus further includes a processor configured to identify a corresponding camera position for a first image of the plurality of images and to output an indication of a global position of the object based on first image data corresponding to the first image and based on the corresponding camera position.

20 Claims, 4 Drawing Sheets

(51) Int. Cl.
 *H04N 7/18* (2006.01)
 *G06T 7/73* (2017.01)
(52) U.S. Cl.
 CPC .............. *G06T 2207/10016* (2013.01); *G06T 2207/10024* (2013.01); *G06T 2207/10032* (2013.01)

(56) References Cited

U.S. PATENT DOCUMENTS

| | | | | |
|---|---|---|---|---|
| 2008/0281553 | A1* | 11/2008 | Frank | A63B 24/0021 702/150 |
| 2009/0175497 | A1 | 7/2009 | Anai et al. | |
| 2009/0316012 | A1* | 12/2009 | Matos | H04N 1/00323 348/208.14 |
| 2013/0004100 | A1 | 1/2013 | Putraya et al. | |

OTHER PUBLICATIONS

Kessler, et al., "Improved Object Geo-Location in Airborne Camera Images using Tight Integration of Vision and Navigation Data," Proc. SPIE 7480 Unmanned/Unattended Sensors and Sensor Networks VI 74800Z, Sep. 24, 2009, 10 pgs.

Li, et al., "Ground moving target geo-location from monocular camera mounted on a micro air vehicle," Proc. SPIE 8194, International Symposium on Photoelectric Detection and Imaging 2011: Advances in Imaging Detectors and Applications, Aug. 18, 2011, 9 pgs.

Noah Snavely, et al., Photo Tourism: Exploring Photo Collections in 3D, Jul. 1, 2006, 12 pgs.

Sagawa, et al., "Accurate Calibration of Intrinsic Camera Parameters by Observing Parallel Light Pairs," 2008 IEEE International Conference on Robotics and Automation, Pasadena, CA, May 19-23, 2008, 8 pgs.

Sawyer, et al. "Cluster-based 3D Reconstruction of Aerial Video," MIT Lincoln Laboratory, Sep. 10, 2012, 6 pgs.

European Office Action, Application No. 13773830.8, dated May 17, 2017, 6 pages.

Summons to Attend Oral Proceedings for European Patent Application No. 13773830.8, dated Jun. 7, 2018, 8 pgs.

Examination Report dated Feb. 5, 2019 issued in corresponding Application No. GB1217395.1, 4 pages.

Brian Williams et al., "Feature and Pose Constrained Visual Aided Inertial Navigation for Computationally Constrained Aerial Vehicles", 2011 IEEE Int Conf on Robotics and Automation (ICRA), May 9, 2011, pp. 431-438.

Saeed Yahyanejad et al., "Incremental, Orthorectified and Loop-Independent Mosaicking of Aerial Images Taken by Micro UAVs", 2011 IEEE Int Symp on Robotic and Sensors Environments (ROSe), Sep. 17, 2011, pp. 137-142.

Young-Jin Lee et al., "In-Flight Camera Platform Geometric Calibration of the Aerial Multi-Head Camera System", Proc of the IEEE 2010 National Aerospace and Electronics Conference (NAECON), Jul. 14, 2010, pp. 136-139.

Koen Douterloigne et al., "On The Accuracy of 3D Landscapes From UAV Image Data", 2010 IEEE Int Geosciences and Remote Sensing Symposium (IGARSS), Jul. 25, 2010, pp. 589-592.

\* cited by examiner

After 40 Images

After 80 Images

After 120 Images

Final Solution

DETERMINATION OF POSITION FROM IMAGES AND ASSOCIATED CAMERA POSITIONS

This application claims priority from and is a continuation of U.S. patent application Ser. No. 14/431,908, titled "DETERMINATION OF POSITION FROM IMAGES AND ASSOCIATED CAMERA POSITIONS," filed Mar. 27, 2015, which is a national-stage entry of and claims priority from International Application No. PCT/GB2013/052530 filed Sep. 27, 2013, which claims priority from Great Britain Application No. 1217395.1 filed Sep. 28, 2012, each of which is incorporated by reference herein in its entirety.

The present invention relates to determination of the absolute position of target object points. This is often referred to as point mensuration.

Point mensuration is required in wide range of military and non-military applications, many of which require accurate determination of geographic coordinates in a timely manner. Such applications include, but are not limited to, indirect targeting of precision guided munitions, in which case extant rules of engagement adhered to by a military unit, derived from both targeting policy and legal constraints, determine the required accuracy, precision and timeliness.

In many applications, the object point can be observed but not approached. In this case, point mensuration can be performed by taking and analyzing an image of the object point captured by a camera and measurements in respect of the camera on capture of the image, including the absolute position of the camera and the orientation of the camera. By way of example, the camera and other sensors mounted on an aerial platform, for example an unmanned aerial vehicle (UAV). Such UAVs are aircraft without a human onboard that may be autonomous or controlled remotely. UAVs are now widely deployed by military forces and are also finding uses in non-military applications. In the case of using an aerial platform, measurements of absolute position may be taken using a global positioning satellite (GPS) receiver, and measurements of orientation may be taken using an inertial measurement unit (IMU).

Some known approaches for point mensuration using images from a camera mounted on an aerial platform together with sensors for taking other measurements are as follows.

A first approach to point mensuration is to use measurements collected by sensors on the platform, which represent the position and orientation of the platform, as well as the orientation and field-of-view of the camera. On the basis of user input designating a target image point in the image that corresponds to the target object point, trigonometry can be used to calculate its geographic coordinates. For example, a chain of geometric transformations may be used to calculate the position of a target using metadata specified in detail in Reference [1]. Unfortunately this approach has several issues which renders it unsuitable for many point mensuration applications, as follows.

A first issue is that the metadata accuracy. The metadata provided by the platform is frequently inaccurate, particularly regarding the platform and/or sensor orientation. Due to the lever-arm effect, any small inaccuracy in orientation results in a large target positioning inaccuracy. Smaller platforms with relatively small and hence less accurate sensors tend to be operated relatively close to the target, while relatively large platforms with correspondingly large and hence more accurate sensors tend to be operated significantly further from the target. For example, a 2° angular error at a slant range of 1000 m yields the same target positioning error as a 0.1° angular error at a slant range of 20 km, namely 35 m (these figures are intended to be illustrative only, and not representative of any particular system).

In addition to estimating the geographic coordinates of a target, is it essential to know the uncertainty of that estimate. In order to do this, the uncertainties of each item of metadata must also be known. These uncertainties are rarely provided by platform and sensor manufacturers, although Reference [2] is seeking to address this.

A second issue is the metadata contents. Once the geometrical calculations are performed, a hypothetical ray is 'fired' from the sensor into the scene. In order to determine the final position of the target, two approaches may be taken. In a first approach, the slant range to the target may be measured, for example using a laser rangefinder. However, such a sensor is expensive and inconvenient, to the extent that it is rarely available in smaller aerial platforms due to the size, weight and power overheads. Furthermore, the risk of detection of the laser beam may limit covert use. A second approach is to estimate the slant range to the target by intersecting the ray with a Digital Elevation Model (DEM) of the scene. For adequately accurate results, this requires an up-to-date, high-resolution DEM which may not be available.

For the reasons detailed above, point mensuration is difficult to perform in this way.

A second approach to point mensuration is to use tie points. In this case, an image analyst manually defines a set of tie points between a single frame of motion imagery and a controlled set of reference orthoimagery, indicating where the same feature can be found in both images. Once enough tie points have been defined, the full geographic position of the motion imagery frame may be established and point mensuration performed. Two certified software tools for this process are Common Geopositioning Services (CGS) and Precision Strike Suite Special Operations Force (PSS-SOF).

While this approach can derive highly accurate and precise coordinates, it requires the availability of both a suitably trained analyst as well as suitable reference data. As such, this process is typically performed at a more strategic, rather than tactical, level and does not support time-sensitive targeting scenarios, such as troops in contact.

Accordingly, it would be desirable to provide determination of the absolute position of a target object point that reduces or avoids some of these issues.

According to an aspect of the present invention, there is provided a method of determining the absolute position of at least one target object point in a scene, the method using a series of images of the scene with overlapping fields of view captured by a camera in positions arranged in at least two dimensions across the scene and position data representing the absolute positions of the camera on capture of the respective images, the method comprising:

analyzing the images to identify sets of image points in plural images of the series of images corresponding to common object points in the scene; and performing a bundle adjustment on the identified sets of image points that estimates parameters representing the positions of the object points relative to the positions of the camera on capture of the respective images without using input orientation data representing the orientation of the camera on capture of the images, and deriving the absolute position of the target object point on the basis of the results of the bundle adjustment referenced by the absolute positions of the camera on capture of the respective images represented by the position data.

Accordingly, the method provides for accurate determination of the absolute position of a target object point in a scene using a series of images of the scene with overlapping fields of view and position data representing the absolute positions of the camera on capture of the respective images, for example GPS data acquired by a GPS receiver. This is achieved by making use of vision-based tracking technology that analyzes the images to solve for the scene structure, i.e., the positions of the object points, relative to the camera track, i.e., the positions of the camera on capture of the respective images.

In particular, the method makes use of an image analysis that identifies sets of image points in plural images of the series of images corresponding to common object points in the scene. This image analysis may be performed using techniques that are known in themselves in the field of machine vision. The image analysis has the effect of allowing the method to track the common object points through the series of images as the basis for performing a bundle adjustment that again may be performed using techniques that are known in themselves in the field of machine vision. Such a bundle adjustment analyzes the images, in particular the sets of corresponding image points, and estimates parameters representing the positions of the object points relative to the positions of the camera on capture of the respective images. This may take into account the absolute positions of the camera represented by the position data as a prior without deriving modified estimates of the positions of the camera.

The results of the bundle adjustment are references to the positions of the camera represented by the position data to provide an absolute position for a target object within the sequence of motion imagery.

The bundle adjustment intrinsically makes use of a relatively large amount of information present in the information and therefore has the capability of providing a high degree of accuracy and in particular a greater accuracy than the first approach discussed above of using a direct geometric transformation of sensor measurements which represent the position and orientation of a platform supporting a camera and the orientation and field-of-view of the camera.

As compared to the second approach discussed above, the ability to perform the method using a data processing technique relying on the images and the position data avoids the need for a suitably trained analyst and suitable reference data, as well as allowing the method to be performed much more quickly, effectively in real time for the purposes of typical applications.

Furthermore, the method may be performed without reliance on input orientation data measured by a sensor associated with the camera representing the orientation of the camera on capture of the images to set initial estimates of the orientations of the camera on capture of the respective images. Thus it is not necessary to measure, and subsequently store and transfer, the orientation, for example avoiding the requirement for a suitable sensor such as an IMU associated with the camera. Such orientation data is commonly acquired in association with position data such as GPS data, and it might be envisaged that the orientation data would be desirable to provide accurate determination of absolute position since it would increase the amount of information available to the bundle adjustment.

However, the present inventors have appreciated that accurate determination of absolute position can be achieved without input orientation data in the case that the images are captured by a camera in positions arranged in at least two dimensions across the scene, for example positions along a curved path. In this case, the set of camera positions as a whole effectively provides information on orientation because it extends in two dimensions across the scene. Conceptually, this may be considered as the set of positions of the camera being a three dimensional object the orientation of which is effectively represented by the absolute positions represented by the position data. Thus, sufficient information is provided to the bundle adjustment by the input position data, without the need to additionally use input orientation data representing the orientation of the camera on capture of the images.

According to a further aspect of the present invention, there is provided an apparatus configured to perform a similar method.

To allow better understanding, an embodiment of the present invention will now be described by way of non-limitative example with reference to the accompanying drawings, in which.

Figure 7:
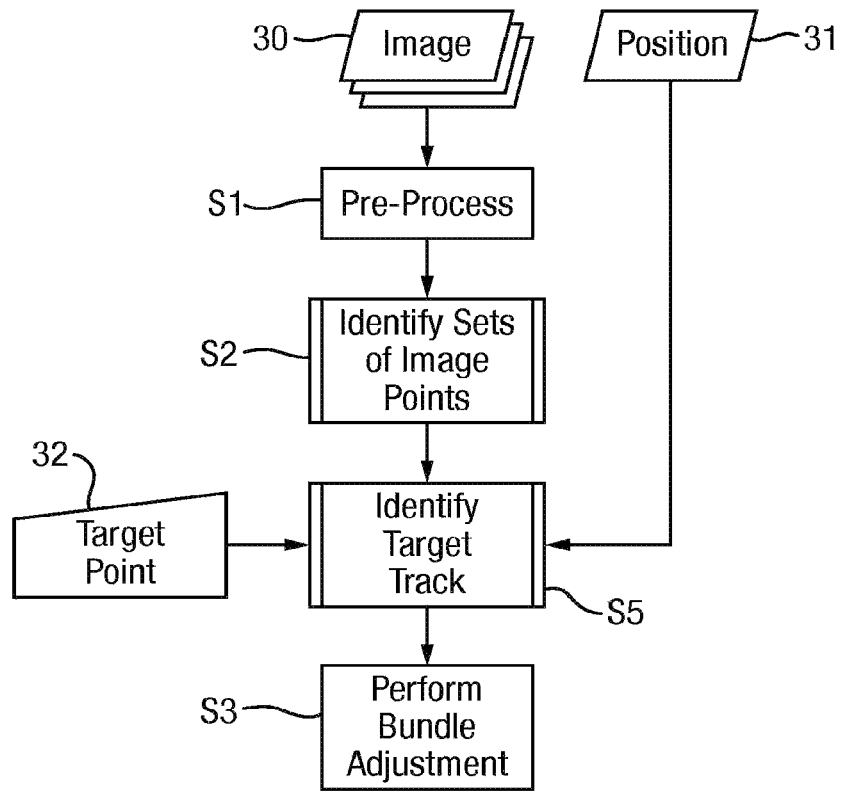
Figure 8:
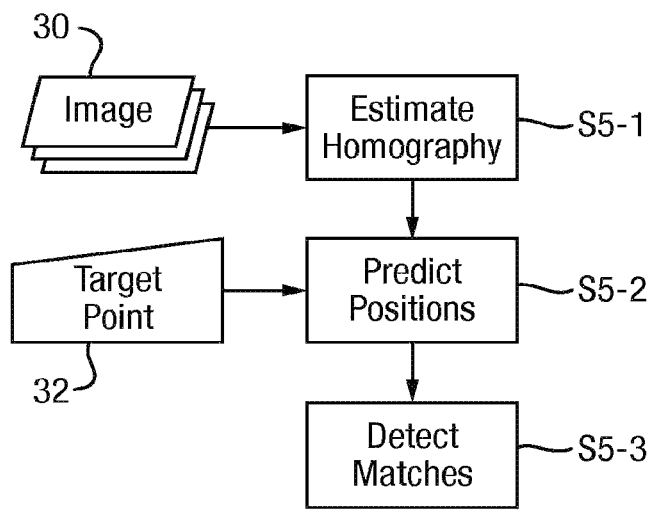

FIGS. 6A, 6B, 6C, and 6D depict reference images of a scene showing camera positions and tracked features;

FIG. 7 is a flow chart of a modified method of determining the absolute position of a target object in a scene; and FIG. 8 is a flow chart of a target tracking step of the method of FIG. 7.

Figure 1:
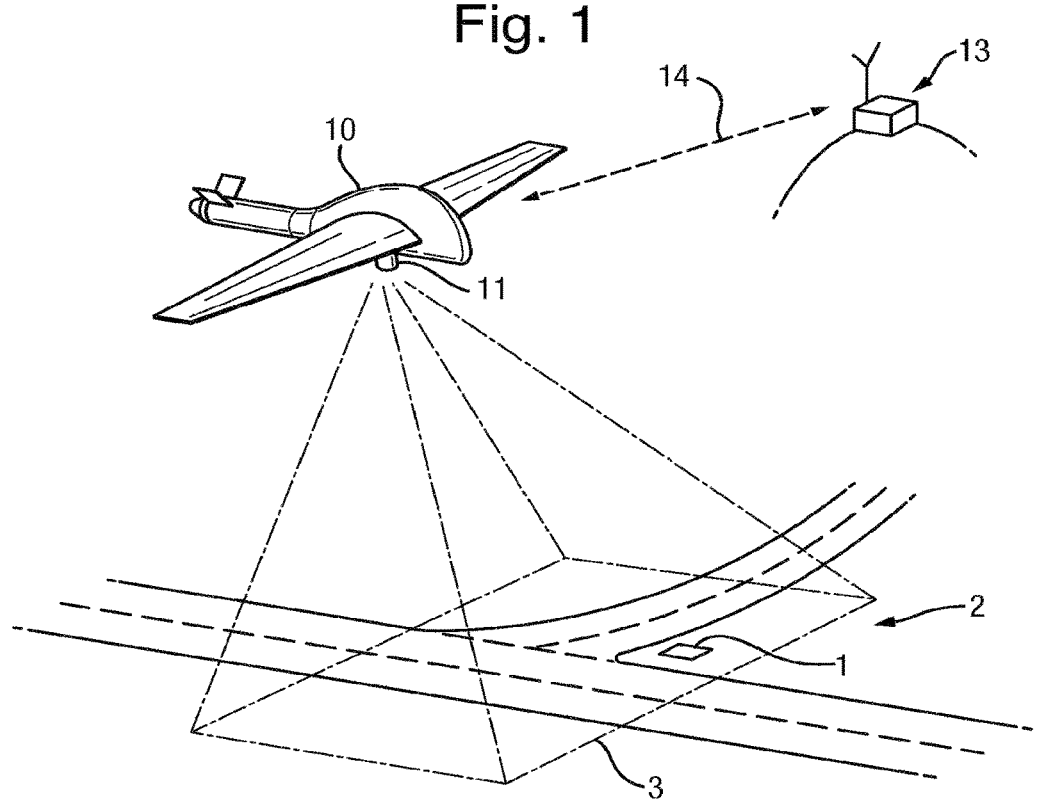
FIG. 1 is a schematic view of a system for determining the absolute position of a target object point in a scene.
Figure 2:
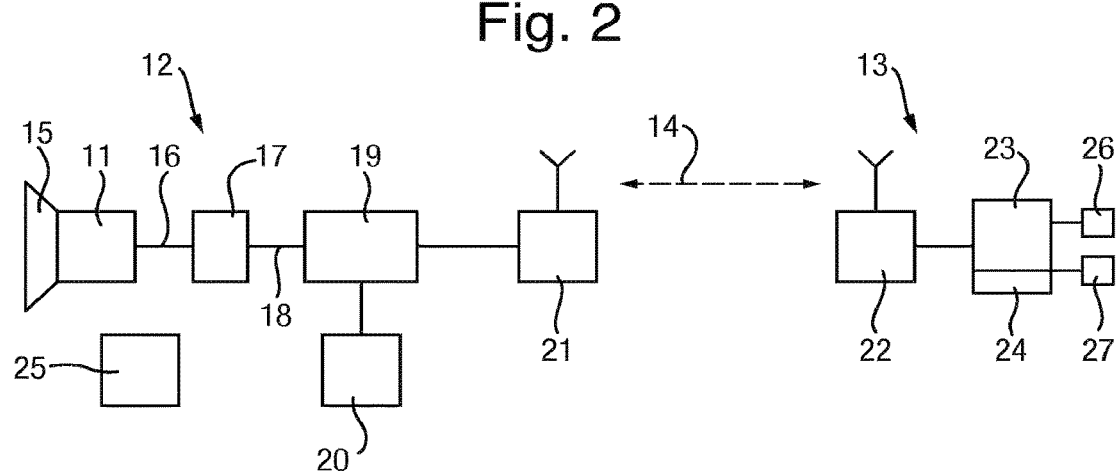
FIG. 2 is a diagram of the components of the system.

FIG. 1 illustrates a system for determining the absolute position of a target object 1 in a scene 2 in the case that the scene 2 is on the ground and the system is implemented using an aircraft 10 mounted with a camera 11 to capture aerial images of the scene 2. In this example, the system comprises the payload 12 of the aircraft 10 and a ground control station 13 which communicate with one another over a wireless datalink 14, as illustrated in the diagram of FIG. 2.

The aircraft 10 may be a manned aircraft or an unmanned aircraft such as a UAV. In the case that the aircraft 10 is unmanned, an autopilot system 25 is present to control the flight path of the aircraft 10. The autopilot system 25 is controlled by the ground control station 13, in particular by transmission of suitable control signals over the datalink 14.

In one practical implementation, the aircraft 10 is a Blackstart UAV supplied by Blue Bear Systems Research, which is a hand-launched UAV. The Blackstart UAV has a payload bay of dimensions 200 mm.times.130 mm that holds the payload 12. In this implementation, the Blackstart UAV is provided with a roll-axis gimbal in order to point the camera 11 at the center of an orbit of the UAV.

The payload 12 comprises the following components.

The payload 12 comprises the camera 11 that is mounted on the aircraft 10 to capture images of the scene 2. In general the camera 11 may be any suitable type of camera that is capable of capturing images of sufficient resolution for the image processing described further in detail below. Many machine vision cameras would be suitable. In one practical implementation, the camera 11 is a Prosilica GB2450C which provides uncompressed color imagery of high resolution (2448.times.2050 pixels) at a high frame rate (15 fps).

The camera 11 desirably has a relatively wild field-of-view to perform the camera tracking discussed in detail below. Combining the likely slant range, platform stability parameters and the likely target size provides for estimation of a range of suitable lenses 15. In one system implementation the lens 15 was a Computar M0814MP2.

The camera 11 supplies captured images over an ethernet connection 16 to a USB-ethernet adapter 17 that functions to repackage the images from an ethernet format in to a USB2 format. The images are then transferred over a USB connection 18 and embedded capture system 19.

The payload 12 also includes a GPS receiver 20 which acquires GPS position data and supplies this to the capture system 19. In general, the GPS receiver 20 may be of any suitable type. One possibility is for the GPS receiver 20 to be part of the autopilot system 25 for the aircraft 10, if provided.

The capture system 19 is configured to perform encoding of the images and the position data for transmission over the datalink 14. The capture system 19 may be implemented by any suitable video processing system, for example a Computer-On-Module (COM).

One practical implementation of the capture system 19 is as follows.

In this implementation the capture system 19 may be a Computer-On-Module (COM), in particular a Gumstix Overo FireSTORM which is a COM based around the TI DM3730 System-on-Chip (SoC) which features a high-performance ARM Cortex-A8 general purpose processor, a specialized TI C64x Digital Signal Processor (DSP) for high-performance, low-power compute-intensive algorithms, a Video Accelerator for video encoding and decoding, as well as a 3D Graphics Accelerator and numerous on-board peripherals. The ARM Cortex-A8 general purpose processor on the TI DM3730 runs a conventional Linux operating system, allowing for rapid software developments and debugging. The payload may operate in either a motion imagery or a still imagery capture mode.

The motion imagery capture mode uses the conventional H.264 compression algorithm, accelerated by the DSP, and transmits an MPEG-2 Transport Stream over the User Datagram Protocol (UDP) consisting of motion imagery and metadata including the position data.

The still imagery capture mode also transmits an MPEG-2 Transport Stream over UDP, but rather than motion imagery, a private data stream is used to transmit high-quality JPEG-compressed still images. The DSP is used to accelerate the compression algorithm.

The reason for the two modes is to better trade off resolution against frame rate. In the motion imagery mode (at lower resolution but higher frame rate), the difference between successive frames is small, so the H.264 compression algorithm is most appropriate. In the still imagery mode (at higher resolution but lower frame rate), the difference between successive frames is large, and the motion estimation aspects of the H.264 compression algorithm struggle and produce poor results, therefore we use the alternative JPEG compression algorithm. An alternative would be to operate the H.264 encoder in an I-frame only mode, although the TI H.264 implementation is limited to a resolution of 1280.times.720.

Practically, images to be analyzed are likely to be still images, although the motion imagery stream may be used to provide real-time imagery for initial identification of a target object.

Due to the Bayer filter used to implement color in the camera, resolution may be changed by windowing the sensor, rather than resizing full images, which results in an effective reduction in the field-of-view as the resolution is decreased.

Tight synchronization between the motion imagery and metadata is desirable. The use of the MPEG-2 Transport Stream provides this through the MPEG-2 Presentation Time Stamp (PTS), which allows the two streams to be reference to the MPEG-2 Program Clock Reference (PCR).

The capture system 19 supplies the encoded images and position data to a datalink interface 21 configured to transmit the encoded data over the datalink 14. The datalink interface 21 contains suitable hardware and software elements for providing data communications over the datalink 14 in accordance with a communications protocol. Any suitable communications protocol may be used. In one practical embodiment the datalink 14 is a Microcard SVIP 5.8 GHz datalink which provides a bidirectional internet protocol communication using commercial WIFI technology at up to 49 Mbps.

The ground control station 13 is configured as follows.

The ground control station 13 includes a datalink interface 22 configured to receive data from the aircraft 10 over the datalink 14. The datalink interface 22 contains suitable hardware and software elements for providing data communications over the datalink 14 in accordance with the communications protocol used.

The ground control station 13 further comprises an analysis apparatus 23 that is supplied by the datalink interface 22 with the images and position data generated by the payload 12 and communicated over the datalink 14.

The analysis apparatus 23 stores the images and position data in a memory 24 and carries out image analysis discussed in detail below. The analysis apparatus 23 has a user interface 26 of any conventional type (e.g. keyboard etc.) for accepting user input. The analysis apparatus 23 includes a display device 27 for displaying the images.

The analysis apparatus 23 may be implemented by a processor executing an appropriate program, although alternatively various functions such as image processing functions may be implemented using appropriate hardware components. Most conveniently, the analysis apparatus 23 is implemented in a conventional computer apparatus such as a personal computer.

The system operates as follows.

The aircraft 10 is caused to fly over a scene 2 to be imaged. Once the aircraft 10 is overhead the scene 2, the aircraft 10, and hence the camera 11, is controlled to fly along a flight path extending in at least two dimensions across the scene.

In the simplest case, the flight path may be a curved flight path. One option is for the flight path to be an orbit around a position on the ground. In that case, that position may be designated by user input to the ground control station 13 on the basis of images captured by the camera 11 and transmitted to the ground control station 13. That position may also be a target object position for the analysis described in detail below.

In other cases, the flight path may comprise plural straight sections that are offset from each other to provide the two-dimensional extent.

As the aircraft 10 flies along the flight path, the camera 11 is controlled to capture a series of images of the scene 2. As the flight path extends in at least two dimensions across the scene, positions in which the images are captured are arranged in at least two dimensions across the scene.

These images each have a field of view 3 as shown schematically in FIG. 1. The fields of view 3 of the respective images overlap but are not necessarily identical. Image capture is controlled to provide a sufficient degree of overlap to perform the image analysis discussed in detail below. In many instances there will be mutual overlap between the fields of view 3 of every image, but this is not essential. One option where the flight path is an orbit around a position on the ground is for the camera 11 to be consistently aimed at that position so that each image has a field of view 3 centered on that position.

As the aircraft 10 flies along the flight path and the images are captured, the GPS receiver 20 outputs position data that represents the absolute positions of the camera on capture of the respective images.

In the subsequent analysis, the position data needs to be synchronized with the timings of the image capture. This may be achieved in any suitable manner. One possibility is for the synchronization to be performed by the capture system 19, for example by the capture system 19 associating each captured image by the camera 11 with the position data output by the GPS receiver 20 at the time of capture. Another possibility is for the capture system 19 to transmit a continuous stream of position data output by the GPS receiver 20 including time information and similarly to transmit the images also with timing data. In that case the analysis apparatus 23 may perform an initial processing step to associate each image with the corresponding position data.

Figure 3:
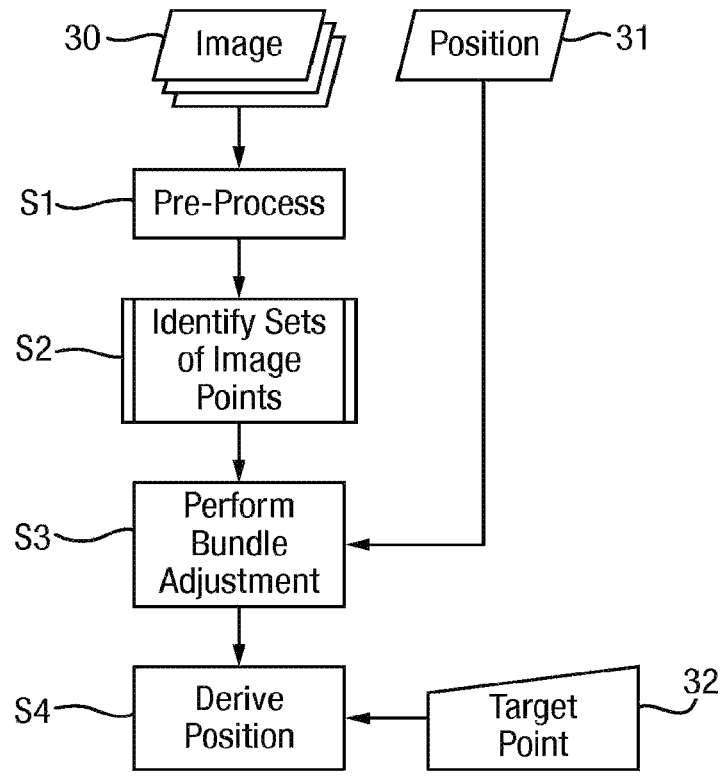
FIG. 3 is a flow chart of a method of determining the absolute position of a target object in a scene.

The ground control station 13 is supplied with the images and the position data obtained in this way. The analysis apparatus 23 then uses the supplied images 30 and the position data 31 to perform a method of determining an absolute position of a target object point in the scene that is illustrated in FIG. 3 and comprises the following steps.

In steps S1, the images 30 are pre-processed to provide them in a suitable format for the subsequent analysis. The pre-processing in step S1 may include downsampling of the images and discard of color information.

The color information is not used by the feature matching framework, and full-resolution images take a long time to process. In addition to this, the sensor pixel resolution often exceeds the spatial and temporal blur in the images, so not much useful information is lost by downsampling, compared to the data already lost by imperfect focus and motion blur. One simple downsampling strategy that may be employed is to build a Gaussian-filtered dyadic image pyramid, and discard the finest levels of the pyramid until the remaining data is an image of less than 2000 pixels width. This typically means that all of the images 30 will be caused to be between 1000 and 2000 pixels wide, with the result that image features can be extracted in real-time.

In addition, the pre-processing in step S1 may include time decimation of frames, in the case that the supplied images 30 are a sequence of motion imagery rather than still images. A typical video camera might run at 15 or 30 frames per second, but many of the frames do not provide much additional useful information (the same features will be tracked between many frames, but the baseline between adjacent frames will be very small). Therefore most of the input frames may be discarded until the image rate is approximately 1-2 Hz. The exact decimation factor may controlled on the basis of user-input, or may be automatically computed, for example to provide a fixed number of frames in a single analysis, or so that subsequent camera positions are a minimum distance away from each other in space.

In step S2, the images 30 that have been pre-processed are analyzed to identify sets of image points in plural images of the series of images corresponding to common object points in the scene. Step S2 uses machine vision techniques which are known in themselves to identify the steps of image points that corresponds to one and other to serve as the basis for a bundle adjustment in step S3 described in detail below. Each set consists of image points in plural images 30 of the series. Within a single set, the image points may be in any number of the images 30, but ideally all the images 30 of the series. Within each set, the image points correspond to one another in that they each correspond to a common object point in the scene 2.

Figure 4:
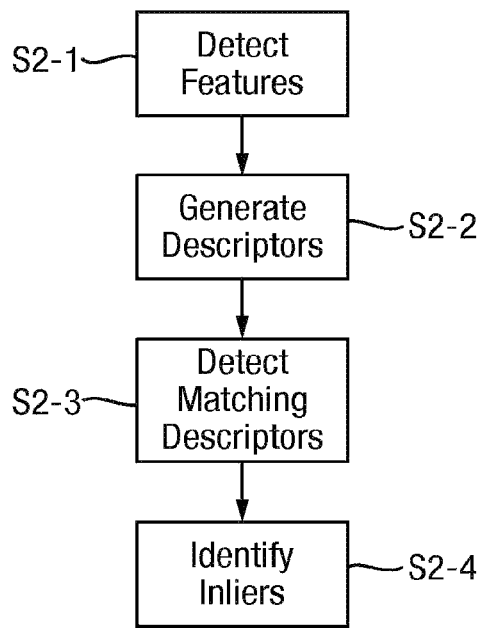
FIG. 4 is a flow chart of a step in the method of identifying sets of corresponding image points.

In particular, step S2 consists of a series of steps shown in FIG. 4, as follows.

In step S2-1 each image 30 is analyzed to detect features within that image 30. In general, any type of image feature may be detected, using any of a range of existing feature detectors known for image processing. Such features are conventionally also referred to as interest points or key points. Typically, it might be desired to produce several hundred features distributed as evenly as possible over the image 30. The exact nature of the features is selected to provide sufficient quantity, easy of acquisition and reliable localization.

In one implementation, the detected features are corner features. This type of feature is suitable where the imagery contains sufficient structure and texture to extract many such corner features stably from each image 30. In this context, a corner feature is a region of the image with a predetermined degree of gradient change in 2 orthogonal directions. A variety of corner feature detectors are known and may be used in step S2-1. An example of method of detecting corner features that may be applied is disclosed in reference [3].

This technique ensures that in successive images, we tend to extract corners corresponding to the same set of real-world 3D features.

Optionally, step S2-1 may be performed to detect features at plural scale. This may be achieved by building a Gaussian-filtered dyadic image pyramid (or to or where this is generated in step S1 to reuse it) and then to perform the detection of features at each level of the pyramid. This allows image structure on each of the different scales to contribute information.

In step S2-2, descriptors are generated in respect of each image 30 from receptive patches of the image 30 at the position of each feature detecting in step S2-1. The purpose of the descriptors is to identify features that correspond across multiple images 30 in order to construct tracks. The descriptor therefore represents a small patch around a feature for use in a comparison in order to identify the corresponding descriptors. Whereas the features are selected for localization, descriptor is aimed at distinctiveness.

As to the patch of pixels around each detected feature used for generating the descriptors, the size is selected as a balance between the discriminatory information contain that increases with size and perspective distortions between views that increase with size and degrade the comparison of the descriptors. Due to noise and actual similarity of the input images, the descriptors can be arbitrarily close, despite stemming from an originally different point.

The descriptors may be generated in a range of different ways. At simplest, the descriptor could be the image data of the patch, but that reduces the ability to detect matching descriptors in different images. Indeed, the problem with making direct comparisons (cross-correlation) of patches around features is that they appear different with changes of intensity, color balance, scale, and rotation. Accordingly, the descriptors are preferably a transform of the patch.

Advantageously, the descriptors are chosen to be invariant to one or more of scale, view angle (including rotation about the device's optical axis), intensity, color and other potential variations due to the viewer and target locations, attitude, and the observer's equipment.

The descriptor may be any of a wide range of descriptors that are known in themselves in the field of machine vision. One option is for the descriptors to be so-called GLOH descriptors generated as described in Reference [4] which display excellent viewpoint invariance and discriminability properties.

The descriptors generated in step S2-2 are compared to identify corresponding descriptors in steps S2-3 and S2-4, as follows.

In step S2-3, there are detected sets of descriptors generated from different images that match each other. Matching may be determined using any measure of proximity of the descriptors which are high-dimensional vectors (say 128 elements), for example a distance function. A match is classified where the measure of proximity indicates similarity above a threshold that may be fixed or may be adaptively determined to obtain a reasonable number of matches. For efficiency, an approximate-nearest-neighbor data structure may be used.

One option is to use an approximate nearest neighbor algorithm based on a kd-tree to search for the best match to a given descriptor within a frame, as follows. The two (approximate) nearest neighbors to a feature are found by searching the tree, and two tests are applied to see if the closer of the two neighbors is a good match. First, the squared distance between the current feature and the nearest neighbor must be below 0.25, and second, the distance ratio of the nearest neighbor to the second nearest neighbor must be less than 0.6. Typically, this approach might find several hundred unguided matches between a pair of subsequent frames.

The approach disclosed in Reference [5] may be used. Using the principles of hash-tables, proximity can be quickly established but might yield false positives.

Step S2-3 is performed without reference to the position of the features to which the descriptors correspond, and so may be considered as putative. The aim is to detect pairs of descriptors in separate images which are very similar. This indicates a high probability that the pair of descriptors come from corresponding locations in each image. However, matches are inevitably also found for pairs of patches which look alike but which are not from the same part of the scene or which relate to a moving object, such as a car.

To avoid this, in step S2-4 there are selected matching descriptors identified in step S2-3 that also conform to a common mapping between the positions in the respective images of the features corresponding to those descriptors (i.e. guided matches). To do this, an assumption of a near-planar scene (where features on the ground should be on a single plane, measured relative to the camera-to-scene distance) is used to robustly estimate a homography using the RANSAC algorithm disclosed in Reference [6]. Matching descriptors that conform to this homography are selected, typically providing upwards of 100-200 unguided feature matches per frame.

However, step S2-4 is optional, because it has been discovered that for typical scenes on the ground such matches do not provide much more useful information, compared to the unguided matches, but do serve to slow down the optimization procedure. It is believed that this is due to the fact that guided matches are shorter-lived (and finer scale) than most unguided matches, and do not provide the extra constraints that a longer-lived track might.

Figure 5:
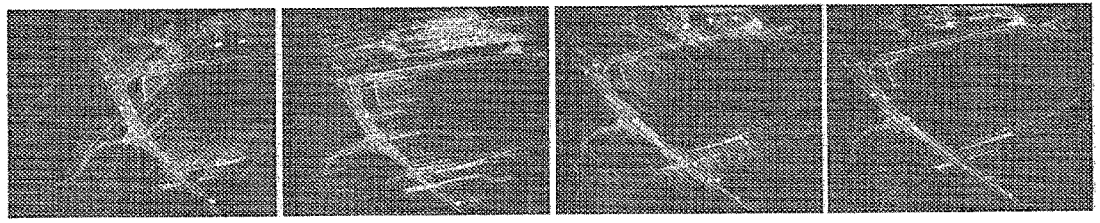
FIG. 5 is a set of four images highlighting unguided matches between descriptors.
Figure 6A:
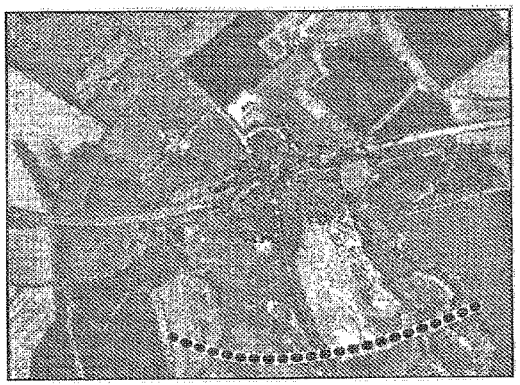
Figure 6B:
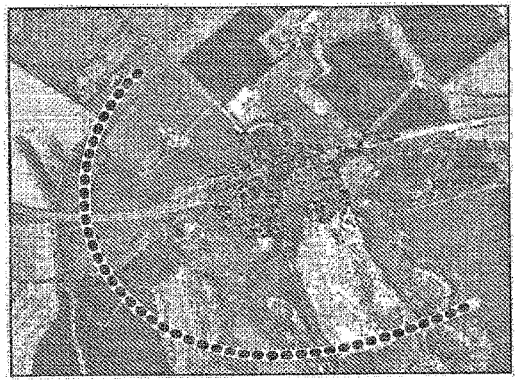
Figure 6C:
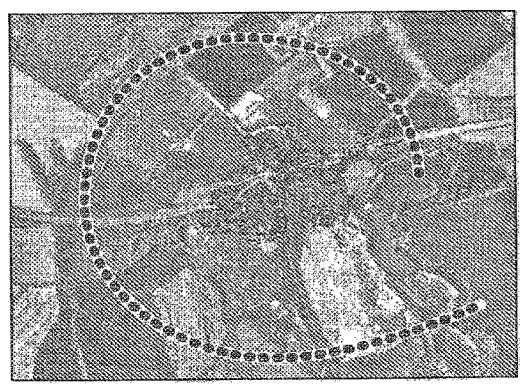
Figure 6D:
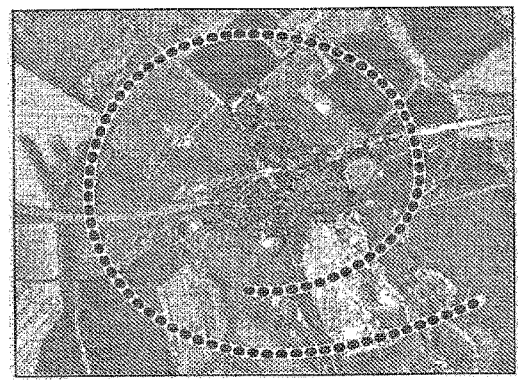

By way of example, FIG. 5 shows sets of unguided matches across four images 30 actually captured. Adjacent images 30 are 8 frames apart in a motion image sequence, as even with this amount of time decimation, there is still plenty of overlap between images 30. Even though the motion is fairly jerky, the frame-to-frame motion is easily extracted from these feature tracks.

In respect of each set of corresponding descriptors derived in step S2-4 (or step S2-3 if step S2-4 is omitted), the positions of the detected features from which the set of corresponding descriptors are generated are identified as a set of image points corresponding to a common object point and output from step S2. The term 'track' may be used to describe the set of image points. When a pair of image points are matched, it is checked if the matched feature in the previous frame was already part of a track. If so, the feature in the new frame is simply added to the end of this track. Otherwise, a new track consisting of the pair of features is created. With good orbit footage, it is possible to build long tracks over tens of frames. Longer tracks give the bundle adjustment described below more information to constrain parameters, leading to faster (and more precise) convergence.

In step S3, there is performed a bundle adjustment on the identified sets of image points output from step S2, i.e. the tracks. The bundle adjustment uses a non-linear optimization technique. A wide range of algorithms known in themselves in the field of machine vision may be applied. The preferred technique is to use a Levenberg-Marquardt bundle adjustment as disclosed in References [7] and [8].

The parameterization of a bundle-adjustment problem plays an important role in the stability and conditioning of the problem, as well as the speed of convergence. Rotation parameters, in particular, require careful handling. In general, the parameters could include all of: the positions of the object points (3D feature point positions); the orientations of the camera 11 in respect of each image 30 (3D orientation); and the positions of the camera 11 in respect of each image 30 (3D camera position). The orientations of the camera 11 in respect of each image may be represented using unit quaternions, Euler angles or modified Rodrigues parameters for orientation. The latter has advantages described in Reference [9]. The key features are that no constraints are needed (whereas quaternion representations require re-normalization), and there are no singularities up to ±360° (whereas Euler angles suffer from gimbal lock).

In a preferred case, the bundle adjustment estimates parameters representing the positions of the object points to which the image points correspond, relative to the positions of the camera 11 on capture of the respective images 30 and also parameters representing the orientations of the camera 11 in respect of each image 30, but not parameters representing the positions of the camera 11 in respect of each image 30. Thus, the positions of the camera 11 in respect of each image 30 represented by the position data 30 are taken into account in step S4 as a prior, and modified estimates are not derived by the bundle adjustment. Thus, 3D absolute positions are retained to describe positions of object points. 3D positions are stored in a local East-North-Up coordinate system, taking the first camera's latitude and longitude, and an altitude of 0 m, as the origin.

Effectively this makes an assumption that the positions represented by the position data 30 are exactly correct. Although this is clearly not the case in fact, the nature of typical scenes 2 makes it difficult to improve camera position estimates with the visual geometry any better than simple sample interpolation will provide. Camera orientations, however, are strongly constrained by the geometry of the scene 2. By halving the number of camera parameters for a given sequence, there is gained simultaneously a significant performance increase and improvement of the conditioning of the bundle adjustment problem, but without losing much precision.

In view of this, it is preferred that the position data is pre-processed and interpolated, rather than using some simpler technique such as sample-and-hold, but this is trivial if accurate timestamps are available with the GPS position data (which is essentially the same as the requirement for the images and position data to be well-synchronized).

Regarding conditioning, to ensure that the implicit Levenberg-Marquardt spherical trust region assumption is valid, the residuals and parameters are conditioned to the unit sphere. To achieve this, the bundle adjustment uses stored data representing the intrinsic properties of the camera. Such camera calibration will now be described.

Camera calibration provides the best possible target precision by removing certain optical effects of the camera, and allowing modelling of the imaging process using a simple pinhole projection model. One aims to achieve two objectives with camera calibration, namely correction of radial lens distortion and estimation of the focal length of the lens relative to sensor size A pinhole camera model simply states that a 3D point in the camera's frame of reference $[X_c \ Y_c \ Z_c]^T$ will project to the image point $[x \ y]^T$ as follows (with $Z_c$ in the direction normal to the image plane, i.e. along the camera's look direction):

$$\begin{bmatrix} x \\ y \end{bmatrix} = \begin{bmatrix} \frac{f_x X_c}{Z_c} + c_x \\ \frac{f_y Y_c}{Z_c} + c_y \end{bmatrix}$$

where $f_x$, $f_y$ are focal length parameters in the X and Y directions within the image plane, and $c_x$, $c_y$ describe the principal point of the camera. For cameras with square pixels and a symmetrical lens, $f_x=f_y$, and for cameras with a w×h pixel sensor centered on the origin, $c_x$=w/2, $c_y$=h/2. In this case, image plane coordinates will map to pixel coordinates.

This may be expressed in homogeneous coordinates as the following linear equation:

$$x_h = KX_c = \begin{bmatrix} x_h \\ y_h \\ s \end{bmatrix} = \begin{bmatrix} f_x & 0 & c_x \\ 0 & f_y & c_y \\ 0 & 0 & 1 \end{bmatrix} \begin{bmatrix} X_c \\ Y_c \\ Z_c \end{bmatrix}$$

where $x=x_h/s, y=y_h/s$.

So far, four parameters need to be estimated (two focal length parameters and two principal point parameters). For many cameras, this might be reduced to three parameters (when $f_x=f_y$) or even one (when the sensor lies on the lens center line, so that $c_x$=w/2 and $c_y$=h/2). Real cameras include an imperfect lens, however, and the lens model that we shall use assumes that all lens distortion is purely radial. More complex lens models, including skew and tangential distortion, are possible, but radial distortion tends to be the major source of error. One possible radial distortion equation is:

$$x_d = x_u(1 + k_1 r^2 + k_2 r^4)$$

$$r^2 = x_u^T x_u$$

where $x_u$ indicates undistorted pre-projection image plane coordinates, and $x_d$ indicates distorted image plane coordinates. This equation is therefore applied after dividing camera-space coordinates by $Z_c$, but before projecting into pixel coordinates with $f_x$, $f_y$, $c_x$ and $c_y$. Therefore in this implementation, the stored data represents a total of six internal camera parameters (including $k_1$ and $k_2$) for any given camera 11 and lens 15.

Applying the camera calibration, the 2D lens-distorted image points that make up the tracks, are taken and then unprojected and undistorted, so that they lie in the "ideal" image plane. Unprojection is the process of translating the image coordinates so that the principal point is at [00]T and then dividing by focal length so that we are in the lens-distorted image plane. The inverse of the lens radial distortion equation is applied so that the tracks conform to the simple pinhole projection model. There is no direct analytic solution, so an iterative approach is used with 5 iterations of the equations:

$$r^2 = x_k^T x_k$$

$$x_{k+1} = \frac{x_u}{1 + k_1 r^2 + k_2 r^4} \text{ with}$$

$$x_0 = x_d$$

$$x_u = x_5$$

The positions are conditioned by computing the mean and standard deviation of all of the Cartesian East-North-Up positions of the object points and cameras 11. This may not result in an exactly spherical conditioning, especially for the first bundle-adjustment (as the initial image points are only rough estimates), but it is close enough for the optimizer to run without encountering numerical ill-conditioning or poor trust region validity. Without this conditioning, it is unlikely that the optimizer would find the correct minimum.

Methods of deriving the stored data representing the intrinsic properties of the camera, and alternative methods for estimating such properties in the bundle adjustment are discussed below.

The bundle adjustment in step S3 is initialized as follows, that is to set initial values for all of the parameters in the problem.

The initialization uses an estimate of the ground plane elevation. While it might be expected that the initial ground plane estimate is fairly important for the 3D point back-projection initialization step to yield reasonable results, typical bundle adjustment techniques such as the Levenberg-Marquardt bundler can actually cope with very large errors in initial locations without needing more than one or two extra iterations. Experiments providing a wide range of values of initial elevation indicate that having a ground plane that is merely in front of the cameras is good enough for fast convergence. Therefore, in the case that the flight path is curved, the present method may derive an estimate of the ground plane elevation from a geometrical measure of the curvature of the path of the absolute positions of the camera 11 in respect of each image 30. A range of geometrical measures may be used. Suitable geometrical measures might be: subtracting half the orbit radius from the lowest point in the flight path, and using this as the ground plane; or looking up the nearest valid value from a coarse Digital Elevation Map (DEM).

As an alternative, the method may estimate the ground plane elevation to be a predetermined value (say 400 m) below the lowest point in the flight path.

Initial estimates of the camera orientation are set as follows, in particular without using input orientation data representing the orientation of the camera on capture of the images. Since the system is operating on images 30 captured from a camera 11 in an aircraft 10, it may reasonably be assumed that the camera 11 will be pointing in the general direction of the target for most of the flight. Initial estimates of the camera orientation are derived that assume each image 30 is captured with the optical axis aligned with a common object point in the scene 2, for example when the flight path is an orbit being in the center of the orbit.

The camera orientation is estimated from a simple geometrical calculation, using the estimate of the ground plane elevation. That is, once we have a notional point in 3D space that the cameras 11 may be looking at has been determined, the orientation of each camera 11 is initialized so that its optical axis passes through this point, and its up-vector is in a vertical plane.

Where there is the possibility of the camera being mounted upside-down, the analysis apparatus 23 may accept user-input of a parameter that indicates whether the camera is in fact mounted upside-down, as the bundle adjustment is unlikely to converge if the initial orientation error is more than 90°, and choose an upwards or downwards up-vector as appropriate.

While computing orientations in this way is unlikely to be particularly accurate, all we need is for the true positions to be in front of the camera 11, and for the cameras 11 to be less than about 90° of roll away from the correct value. This technique works for all of the test sequences, and is likely to work for any other sequence that approximates an orbit, providing that the camera 11 does not perform a full roll during the sequence capture. Therefore, more generally, the initial estimates of the camera orientation may take any values within 90° of each other.

Initial estimates of the positions of the object points relative to the positions of the camera 11 in respect of each image 30 are set as follows. Based on the initial estimates of the orientations of the camera 11 in respect of each image 30, a track that is observed by multiple cameras 11 is taken, and the 3D geometry of the track is back-projected using linear or non-linear methods. This is possible because there is a known baseline between the cameras 11, and as a result, the point can be triangulated.

However, the camera orientation estimates are very approximate, and are likely to have errors of several degrees, to the extent where the geometry of the problem may indicate that a point is behind the camera or near infinity. To alleviate this problem, it is assumed that there is a horizontal ground plane somewhere beneath the camera 11, and the initial estimates of the positions of the object points are constrained to lie on this plane, using the initial estimate of the ground plane elevation derived as discussed above. The resulting linear equations are solved for minimum reprojection error using a Singular Value Decomposition (SVD) for numerical stability. It should be noted that once the initialization step is complete, the concept of a ground plane is discarded and the positions of the object points are allowed to move anywhere in world space during the optimization.

Where a Levenberg-Marquardt optimizer is used in the bundle-adjustment, the following process is performed. There is solved the linear system:

$$(H_k + \lambda D)\delta x_k = g_k^T$$

in order to perform the update step:

$$x_{k+1} = x_k + \delta x_k$$

A sparse cameras-and-features system of equations is optimized, based on division of the modified Hessian $H_k + \lambda D$ into four quadrants:

$$\begin{bmatrix} U & W \\ W^T & V \end{bmatrix} \begin{bmatrix} x_1 \\ x_2 \end{bmatrix} = \begin{bmatrix} y_1 \\ y_2 \end{bmatrix}$$

Gaussian elimination is applied to this set of equations to solve the reduced top row:

$$(U - WV^{-1}W^T)x_1 = y_1 - WV^{-1}y_2$$

via Cholesky factorization. The top row is much quicker to solve, because the number of cameras (hence the number of blocks in U) is much smaller than the number of features (and blocks of V, block columns of W). However, some substantial sparse matrix multiplications need to be performed before we can run the Cholesky factorization (the inverse operations are cheap because U and V are block-diagonal).

The sparse BLAS library functions implemented in the Intel Math Kernel Library have been used to improve the speed of the sparse matrix operations at the core of the bundler. Specifically, the U and V matrices are now stored in the Block compressed Sparse Row (BSR) format, and the W matrix is stored in the Compressed Sparse Row (CSR) format. However, one of the key functions, that is the matrix-matrix multiplication of $V^{-1}$ and $W^T$, cannot be achieved with the available Sparse BLAS routines without first converting WT into a dense format. Even better performance may still be achievable by storing W in a rectangular BSR format (as disclosed in Reference [10]) and hand-coding a square BSR/rectangular BSR matrix-multiplication algorithm (ideally using hardware-optimized vector instructions).

One possibility for initializing and updating the Marquardt parameter $\lambda$, is to initializing to $10^{-5}$ and then dividing by 10 on a successful update, or multiplying by 10 if the objective function increases. While this strategy does generally find the correct solution, it tends to have poor convergence behaviour, as it can take several iterations to reach the appropriate value of $\lambda$ for the current position in the objective function parameter space, noting that $\lambda$ controls the extent to which the Levenberg-Marquardt optimizer behaves like a gradient descent optimizer (large $\lambda$) and a Gauss-Newton optimizer (small $\lambda$), by defining the trust region size. In general, the bundle-adjustment problem is well behaved, even in the initial iterations, so we may use a small value of $\lambda$ to start with.

Another possibility that is preferred is to use the method outlined in Reference [11] to control the parameter step updates, essentially using the gain factor to decide how well-behaved our function is, and we ensure that our initial value of $\lambda$ is normalized to the size of the maximum diagonal element in the information matrix. The net result of this change is that faster convergence is observed, due to fewer iterations of the optimizer being required to obtain a given degree of precision.

Bad track removal will now be considered. It is possible that despite the robust homography estimation employed in the feature matcher, some tracks contain bad matches. Such tracks will have a dramatic effect on the solution calculated by the bundler, so we continue to use a robustification strategy which is to delete tracks with large reprojection error after every n bundler iterations, where n takes a suitable value such as 7 to avoid unnecessarily deleting good tracks while the bundler is still converging In addition to this, the maximum number of tracks that may be deleted in any one iteration can be limited (currently to 10 tracks), so that if the bundler has converged on a poor solution due to one or two bad tracks, not so many good tracks are deleted as to prevent convergence on a good solution in future iterations. The tracks are sorted such that those with the worst reprojection errors get deleted first.

In summary, the bundle adjustment comprises the following processes: Initialize camera orientations Initialize feature positions by back-projection on an estimated ground plane Refine these parameters by minimizing track reprojection error with a Levenberg-Marquardt bundler During the bundle-adjustment, remove tracks with poor reprojection error after a certain number of iterations The bundle adjustment comprising these processes is repeated every time a predetermined number of images 30 is received, for example every 40 images 30.

By way of example, FIGS. 6A-6D show the same reference image (taken from Google Earth in this instance) of a scene 2 being imaged by the system which is overlaid with marks indicating the positions of the camera 11 (green lines) on capture of successive images 30 and the position of detected features (red dots) that correspond in the captured images 30. FIGS. 6A-6D show the progression of camera position and position parameters in the bundle adjustment problem as more successive groups of 40 images 30 are added to the solver. It can be seen that as more images 30 are used, the estimated positions (red dots) become better aligned with the reference imagery used for visualization. The fine adjustments to camera orientations cannot be seen at this scale, but the overall orbit shape shows why the initialization strategy (cameras pointing inwards) is valid.

Bounding problems may be considered given the use of many cameras. While the improved Levenberg-Marquardt solver code allows one to solve fairly large bundle adjustment problems (~100 cameras) in a few seconds, the total bundle size needs to be limited to avoid slow performance and high memory usage on extremely large problems. As a result, when there are more than a predetermined number of images 30, for example 200 images 30, the method ceases adjustment based on the oldest images 30 in the set (since these will have the least influence from the newest features). In practice, this means that bundle adjustment always runs within a few seconds, and long sequences may be used. However, little precision benefit is gained from more than one full orbit of a target, or using more images per orbit, so this limit is rarely reached in practice.

When all the images 30 have been processed, the results of the bundle adjustment are the estimated parameters, which include the parameters representing the positions of the object points corresponding to the sets of image points relative to the positions of the camera 11 on capture of the respective images 30. Since the bundle adjustment is referenced by the absolute positions of the camera 11 on capture of the respective images 30 represented by the position data 31, these parameters also represent the absolute positions of the object points.

In step S4, the absolute position of any number of target object points is derived on the basis of these results, as follows. The analysis apparatus 23 receives user input 32 designating one or more target image points in at least one of the images 30. This may be done for example using a cursor as part of the user interface 26. The target image point can be the position on the ground designated as described above to control the flight path, or can be a fresh position arbitrarily selected by the user from the images 30. The target image point corresponds to the target object point in the scene 2.

In step S4, a group of image points located around each designated target image point are selected. Each target image point corresponds to the target object point in the scene 2. Accordingly, in step S4, the position of each target image point is interpolated from the absolute positions of the selected group of object points that have been estimated in step S3.

This method provides for accurate determination of the absolute position of the target object point without needing to use orientation data representing the orientation of the camera on capture of the images, thereby avoiding the need for a suitable sensor such as an IMU associated with the camera 11 on the aircraft 10 and avoiding the need to transfer such data from the aircraft 10 to the ground control station 13. All that is needed are the overlapping images 30 with the associated position data 31.

There will now be discussed the camera calibration used to determine the stored data representing the intrinsic properties of the camera 11.

There may be applied the usual approach to camera calibration, that is to capture several images of a known 3D scene with the camera 11, find salient points from the 3D scene within the images, and then compute the camera model parameters by comparing the observed image locations to the expected locations from a simple pinhole camera model. To automate the extraction of salient points in the image, a checkerboard pattern is commonly used, where corners of the grid squares are easy to detect. Since the size of the grid squares is known, the 3D scene is known up to a rotation and translation (the checkerboard may be translated along 3 axes relative to the camera, and rotated about 3 axes as well, giving 6 degrees of freedom). As there are many more grid corners than parameters (camera optical parameters plus the pose degrees of freedom), one may solve for the best set of parameters that minimize the reprojection error. A Levenberg-Marquardt optimizer is typically used for this step.

To get the best estimate of the camera's optical parameters, especially the radial distortion parameters, it is important to ensure that the checkerboard covers a large proportion of the image. This has the effect of covering areas where radial distortion is largest (near the edges of the images), as well as making the checkerboard corner location step more robust to image noise and the aliasing process inherent in capturing an image as an array of pixels.

Both free and commercial software packages are available to perform checkerboard calibration (e.g. the OpenCV library's findChessboardCorners and calibrateCamera functions, and the MATLAB Camera Calibration Toolkit).

Although in theory, a fixed-lens, fixed-focus camera only needs to be calibrated once, this is not the case in practice. Thermal expansion of components, light knocks, vibration, and other physical forces acting on the lens and camera components, can change the relative positions of the lens and sensor. For the present method, image errors of a few pixels can introduce geographical errors of a few meters. For best results, therefore, a camera in frequent use should be re-calibrated on a regular basis. If the camera 11 is mounted underneath a small UAV that receives knocks upon landing, re-calibration before each flight might be necessary.

A camera 11 forming part of a UAV sensor payload will typically be imaging objects that are many hundreds of meters away, and as such, the lens 15 on such the camera 11 will typically be set to focus at a large distance (perhaps infinity) However, when calibrating with a checkerboard, it is required that the checkerboard covers a large proportion of the image. If a small checkerboard is held close to the camera, 11 it will fill the field of view 3, but the image will be badly out of focus. Ideally, an extremely large checkerboard would be held a long way from the camera (maybe hundreds of meters away), but such a checkerboard would be very large (say the size of a house).

One solution is to build and use such a large checkerboard with the obvious disadvantage that the aircraft 30 must always fly over it before it may be used elsewhere, and if the camera 11 needs to be re-calibrated frequently and in different locations, this might not be practical.

Another solution is for an expert user to manually find correspondences between features in an aerial image taken by the camera 11, and a controlled georeferenced image that has been previously generated via some other means. These correspondences are known as tie points, but suffer from the disadvantages that reference imagery may be unavailable and that the manual process is slow.

Another solution is to calibrate with a smaller checkerboard, say of the order of 1 meter square. This is difficult as it will be badly out of focus (if it fills the image), but solutions are known, for example taking repeated images with the checkerboard in different image locations to build up coverage of the field of view, or using a corner refinement algorithm to localize a corner that is subject to considerable blurring to a reasonable degree of accuracy. Alternatively, the aperture of the lens may be decreased, which increases the depth-of-field without changing the lens calibration parameters. By finding a compromise between these factors, a reasonable calibration may be achieved with a checkerboard small enough to carry by hand.

The above techniques are suitable for cameras 11 with a lens 15 providing a fixed field-of-view and a fixed focus lens. Where the lens 15 is a zoom lens, the zoom position must also be taken into account, for example on the basis of metadata representing the zoom state at the time of image capture.

As an alternative, the bundle adjustment may estimates parameters representing the intrinsic properties of the camera. This complicates the bundle adjustment but is feasible using known machine vision techniques, for example as are commonly used by the entertainment industry to compute camera tracks from motion imagery. Whilst this alternative might be less accurate, it opens up possibilities for performing the method on data collected from a much wider variety of sources. Various modifications to the method described above are possible, some examples of which are as follows.

A first modification is to perform a target tracking approach by modifying the method as shown in FIG. 7 to replace step S4 by a step S5 performed prior to the bundle adjustment of step S3 (step S5 being shown in FIG. 7 as occurring after step S2 but optionally being performed before that).

Step S5 uses the user input 32 designating one or more target image points in at least one of the images 30, as described above. In step S5, in respect of each designated target image point, there is identified a set of target image points in plural images 30 of the series of images 30 that correspond to that designated target image point and hence to the target object point. This is done using a machine vision technique as follows.

Target tracking has one important limitation, namely that the target does not change. Meeting this requirement is dependent on the user selecting an appropriate target. Clearly it is impossible to assign a single position to a moving target, but there is an additional constraint that the target does not continuously change shape (e.g. an object that is rotating, or perhaps deforming in the wind), because such targets are difficult to reliably track in motion imagery.

The target tracking also assumes that image-to-image perspective changes are small, such that the changing appearance of the object in subsequent frames may be modelled by an affine transform. This is a reasonable assumption given that the camera 11 is expected to fly overhead the subject, with a reasonably small baseline between images 30 compared to the overall size of the flight path.

A further assumption used is that the scene 2 in any given image 30 is approximately planar. This corresponds to an assumption that the change in height of structures within the scene 2 is small compared to the distance from the scene to the camera-again, a very reasonable assumption in the usual case of an aircraft 10 flying over a scene 2 at a moderate distance.

Step S5 comprises steps S5-1 to S5-3 shown in FIG. 8 and performed as follows.

In step S5-1, there is estimated a homography between the one of the images 30 in which the designated target image point is designated and other images 30. Based on an assumption that the scene 2 is approximately planar compared to the scene-to-camera distance, adjacent images 30 are related by with a homography H. This is a 3.times.3 matrix that relates (homogeneous) image coordinates between images A and B such that:

$$x_A = H x_B$$

In step S5-1, this homography is estimated using the RANSAC algorithm disclosed in Reference [6].

In step S5-2, the position of the designated target image point in each of the other images 30 is predicted using the homography.

As the predicted position is unlikely to be exactly correct, in step S5, a matching approach is used. In particular, in each of the other images 30, a search region around the predicted position of the designated target image point is selected. This search region may be defined simply by using the position predicted by the homography as the center point, with the width and height of the search region being proportional to the width and height of the image patch by a predetermined factor (e.g. twice). The homography is used to warp the image patch in the first image (typically 16.times.16 pixels) into the coordinate system of the second image.

Then, in respect of each search region, there is detected an image patch that matches an image patch at the position of the designated target image point in the one of the images in which it is designated. Template matching may be used, which involves sliding this warped image patch across all pixel coordinates in the second image search region, computing a similarity score at each point, and detecting a match when the similarity score represents maximum similarity. A suitable similarity score is an L2-norm difference measure (which represents maximum similarity by a minimum score). Another suitable similarity score is a normalized cross-correlation.

Step S5-3 identifies the set of target image points are identified as being at the position of the designated target image point and at positions of matching patches in the other images detected in step S5-3. The positions may be refined to sub-pixel resolutions as follows to avoid drift in the tracked target. The sub-pixel refinement is to approximate the 1-neighborhood of the difference cost minimum with a quadratic surface fit. If this surface yields a stable minimum, the refined sub-pixel position of the minimum as the tracked target position. If, however, the surface contains a saddle point, target tracking is stopped on the assumption that the target has become occluded or otherwise disappeared from view.

Our other criterion for termination of target tracking is to check the location of the search patch. When it overlaps with the edge of the image, tracking ceases.

In practice, step S5 may achieve a target track sustained accurately for many consecutive images 30.

In the modified method, steps S1 and S2 are performed as described above, and the bundle adjustment of step S4 is also performed in the same manner, except that it is performed on the set of target image points, i.e. the target track, together with the identified sets of image points derived from image features. As a result, the estimated parameters represent the position of the target object point, together with the positions of the object points. This means that the position of the target object point is derived intrinsically by the bundle adjustment, without the need to perform step S4.

In this modified method, error estimation may be performed as follows.

There is approximated the point error in the estimated position of the target image point arising from an assumption of Gaussian image noise with standard deviation $\sigma_x$, using the Schur complement of the Markov blanket of the target feature parameter. This gives us a 3D point covariance matrix for the target point with feature index t, in conditioned world coordinates, with the formula:

$$A_{XYZ} = \begin{bmatrix} a & b & c \\ d & e & f \\ g & h & i \end{bmatrix} = \left(\frac{1}{\sigma_x^2}(V_{tt} - W_t^T U_t^{-1} W_t)\right)^{-1}$$

with $V_{tt}$ being the t'th diagonal 3×3 block of the full V feature information matrix, and $U_t$, $W_t$ being those portions of the full U and W matrices that refer to cameras containing the target track (that is, the feature with index t).

This error estimate (which is purely derived from image noise) may be extended with an assumption of some Gaussian-distributed systematic error in the GPS signal. As we are only interested in the X and Y components of error, the 2×2 upper left block of the 3D covariance matrix is extracted before adding the GPS covariance matrix and computing the standard deviation matrix via an SVD:

$$A_{XY} = \begin{bmatrix} a & b \\ d & e \end{bmatrix}$$

$$A_{total} = A_{XY} + A_{gps} = U \Sigma V^T$$

$$\Sigma = \begin{bmatrix} \sigma_1^2 & 0 \\ 0 & \sigma_2^2 \end{bmatrix}$$

$$\sigma_{total} = U \begin{bmatrix} \sigma_1 & 0 \\ 0 & \sigma_2 \end{bmatrix} V^T$$

This error estimate may be visualized by drawing a 3σ ellipse around the target location on the ground.

Experimental trials of the system have been performed over various rural and semi-urban scenes 2. Utilizing the modified method of FIG. 7 to analyze the captured images 30 targets. This produced estimated positions of the target object which were generally in the range of 3-6 m of the actual position of the target object as surveyed by a GPS position measurement at the actual target, with 3σerror ellipse major radii generally in the range of 6-9 m. This demonstrates accurate determination of position.

Furthermore, the run time of the algorithm was measured, using an Intel Core i7 870 CPU as the processor of the analysis apparatus, with a single core applied to both the feature tracking of step S2 and the bundle adjustment of step S3. Typical run times for the feature tracking were of the order of 250 ms per image 30. Typical run times for the bundle adjustment were 1 s, 6.1 s, 9.1 s and 16.8 s for a bundle adjustment where the number of images 30 was 40, 80, 120 and 160, respectively. Using 160 images 30, typically the entire method was performed in about 24 s. Thus, for many applications, and in particular in comparison with the image capture times it can be seen that the method is effectively performed in real time.

REFERENCES

References [1] to [9] cited above are identified as follows and are incorporated herein by reference: [1] Motion Imagery Standards Board: UAS datalink local metadata set, Standard 0601.4, 4 Mar. 2010. [2] Motion Imagery Standards Board. Photogrammetry metadata set for digital motion imagery, Engineering Guideline (EG) 0801.2, December 2009. [3] Jianbo Shi and Carlo Tomasi, "Good features to track", In 1994 IEEE Conference on Computer Vision and Pattern Recognition (CVPR'94), pages 593-600, 1994. [4] Krystian Mikolajczyk and Cordelia Schmid, "A performance evaluation of local descriptors", IEEE Trans. Pattern Anal. Mach. Intell., 27(10):1615-1630, October 2005. [5] Muja and Lowe, "Fast approximate nearest neighbors with automatic algorithm configuration", International Conference on Computer Vision Theory and Application VISSAPP'09, pages 331-340. INSTICC Press, 2009. [6] Martin A. Fischler and Robert C. Bolles, "Random sample consensus: a paradigm for model fitting with applications to image analysis and automated cartography", Commun. ACM, 24(6):381-395, June 1981. [7] Levenberg, "A Method for the Solution of Certain Non-linear Problems in Least-Squares", Quarterly of Applied Mathematics, Vol. 2, No. 2, July 1944, 164-168. [8] Marquardt, "An Algorithm for the Least-Squares Estimation of Nonlinear Parameters", SIAM Journal of Applied Mathematics, Vol. 11, No. 2, June 1963, pp. 431-441. [9] S Marandi and V Modi, A preferred coordinate system and the associated orientation representation in attitude dynamics, Acta Astronautica, 15(11):833-843, 1987. [10] Changchang Wu, Sameer Agarwal, Brian Curless, and Steven M Seit, "Multi-core bundle adjustment", Computer Vision and Pattern Recognition (CVPR) 2011, 10(x):3057-3064, 2011. [11] H. B. Nielsen, "Damping parameter in Marquardt's method", Technical report, Informatics and Mathematical Modelling, Technical University of Denmark, DTU, Richard Petersens Plads, Building 321, DK-2800 Kgs. Lyngby, April 1999.

What is claimed is:

1. An apparatus comprising:
   an interface configured to receive image data and position data, the image data associated with a plurality of images of a scene including an object, the position data associated with positions of a camera that captured the plurality of images; and
   a processor configured to:
      identify a camera position corresponding to a first image of the plurality of images;
      identify a relative position of the object relative to the camera, the relative position identified based on first image data corresponding to the first image, second image data corresponding to a second image of the plurality of images, and the camera position; and
      output an indication of a global position of the object based on the position data and the relative position of the object.

2. The apparatus of claim 1, wherein the global position of the object is determined without using orientation measurement values corresponding to orientations of the camera during capture of the plurality of images.

3. The apparatus of claim 1, wherein a first image of the plurality of images has an overlapping field of view with the second image, the overlapping field of view including the object.

4. The apparatus of claim 1, wherein the positions of the camera correspond to a flight path of an aircraft that includes the camera, and wherein the flight path comprises a curved path with respect to a physical location of the object.

5. The apparatus of claim 1, wherein, for each image of the plurality of images, the image data includes a corresponding time stamp that indicates a time at which the image was captured.

6. The apparatus of claim 1, wherein the position data comprises global position data corresponding to the positions of the camera during capture of the plurality of images.

7. The apparatus of claim 1, wherein, for a position of the camera at a time in which the camera captured the first image, the position data indicates a latitude, longitude, altitude, or a combination thereof.

8. The apparatus of claim 1, wherein the interface is further configured to receive second image data and second position data, the second image data associated with a second plurality of images of the scene, the second position data associated with positions of a second camera that captured the second plurality of images.

9. The apparatus of claim 8, wherein the position data corresponds to a first flight path and the second position data corresponds to a second flight path.

10. The apparatus of claim 1, further comprising:
    a memory coupled to the processor and configured to store the image data and the position data; and
    a user interface configured to receive an input that identifies the object in a particular image of the plurality of images.

11. The apparatus of claim 1, further comprising a display device coupled to the processor, wherein the indication of a global position of the object is presented via the display device.

12. A method comprising:
    receiving image data associated with a plurality of images of a scene including an object;
    receiving position data associated with positions of a camera that captured the plurality of images;
    identifying a camera position that corresponds to a first image of the plurality of images, the camera position corresponding to a time the camera captured the first image;
    identifying a relative position of the object relative to the camera, the relative position identified based on first image data corresponding to the first image, second image data corresponding to a second image of the plurality of images, and the camera position; and
    outputting an indication of a global position of the object based on the position data and the relative position of the object.

13. The method of claim 12, further comprising receiving a user input designating a target image point in at least one of the images, the target image point corresponding to the object.

14. The method of claim 12, wherein the position data comprises global position system (GPS) data and time information.

15. The method of claim 12, further comprising:
    detecting a first set of features based on the first image data;
    generating a first set of descriptors for the first image based on the first set of features;
    detecting a second set of features based on second image data, the second image data corresponding to the second image;
    generating a second set of descriptors for the second image based on the second set of features; and
    matching the first set of descriptions associated with the first image to the second set of descriptors associated with the second image.

16. The method of claim 15, wherein a first feature of the first set of features comprises a corner feature.

17. The method of claim 15, wherein identifying the camera position includes determining an estimated orientation of the camera, the estimated orientation determined independent of measured orientation data and determined based on an optical axis of the camera being aligned with a common object point, the common object point depicted in each image.

18. A system comprising:
    a camera configured to generate image data associated with a plurality of images of a scene including an object;
    a position receiver configured to generate position data associated with positions of the camera during image capture operations; and
    a processor configured to:
       identify a camera position corresponding to a first image of the plurality of images;
       identify a relative position of the object relative to the camera, the relative position identified based on first image data corresponding to the first image, second image data corresponding to a second image of the plurality of images, and the camera position; and
       output an indication of a global position of the object based on the position data and the relative position of the object.

19. The system of claim 18, further comprising an aircraft that includes the camera and the position receiver.

20. The system of claim 18, further comprising a clock configured to generate a clock signal, wherein each image of the plurality of images is associated with a corresponding timestamp generated based on the clock signal, and the position data includes, for each position of the positions of the camera, a corresponding time indicator determined based on the clock signal.

\* \* \* \* \*